Jan. 8, 1924.　　　　　　　　　　　　　　　　　　　　1,480,042
O. J. BETTEZ
VEHICLE DIRECTION INDICATOR
Filed June 16, 1923　　　　2 Sheets-Sheet 1
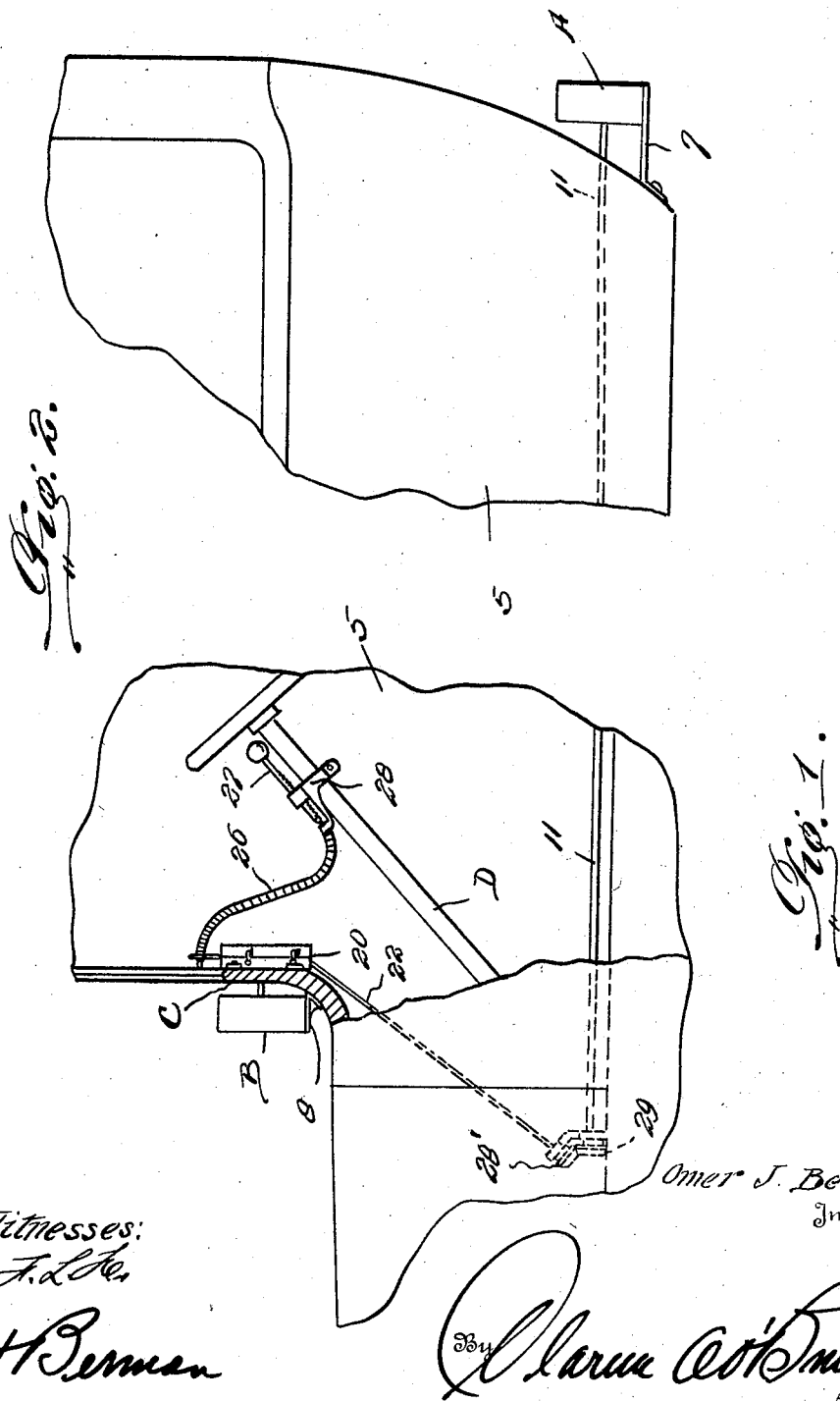
Witnesses:
Omer J. Bettez.
Inventor
Attorney

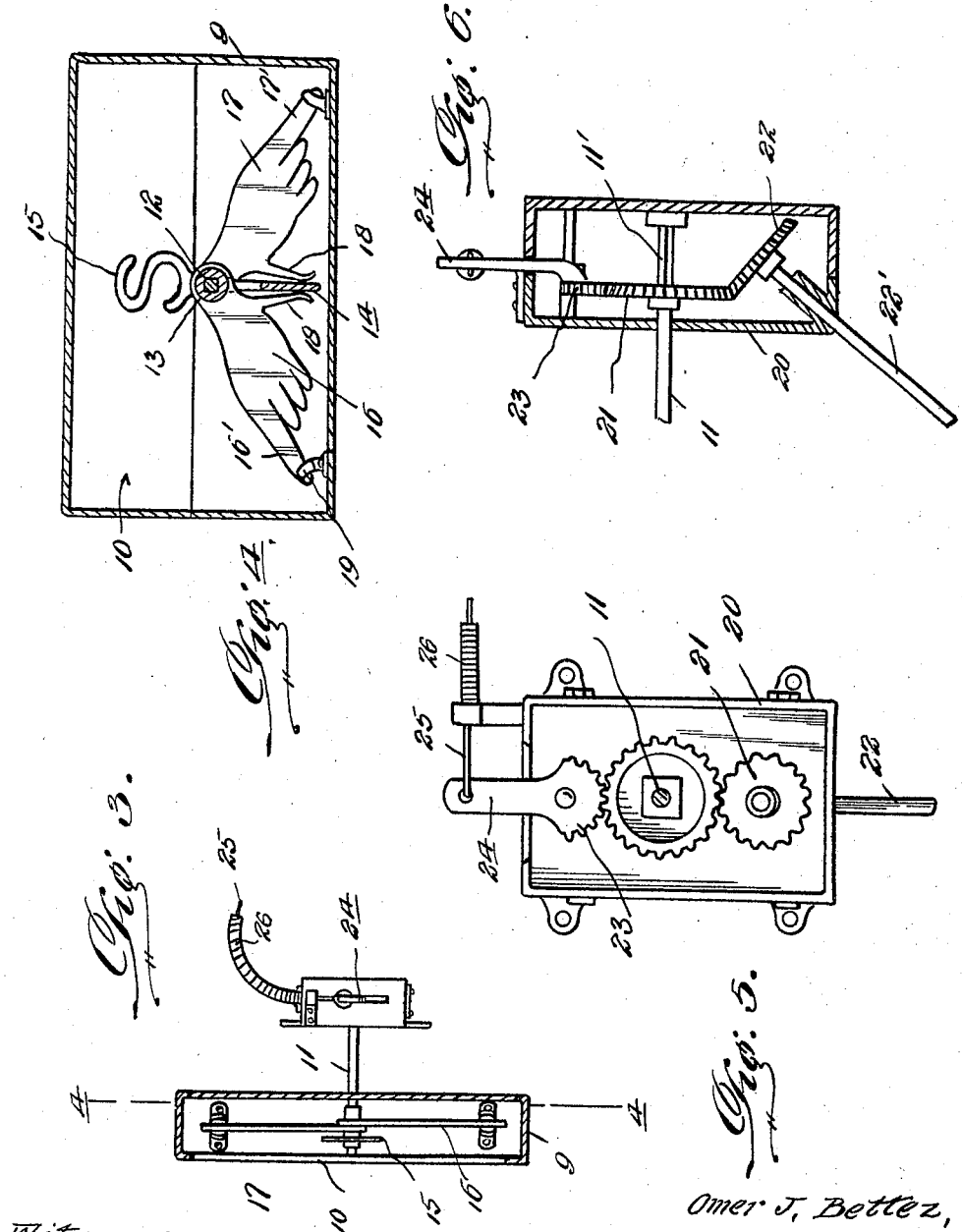

Patented Jan. 8, 1924.

1,480,042

UNITED STATES PATENT OFFICE.

OMER J. BETTEZ, OF DERRY, NEW HAMPSHIRE.

VEHICLE DIRECTION INDICATOR.

Application filed June 16, 1923. Serial No. 645,885.

*To all whom it may concern:*

Be it known that I, OMER J. BETTEZ, a citizen of the United States, residing at Derry, in the county of Rockingham and State of New Hampshire, have invented certain new and useful Improvements in Vehicle Direction Indicators, of which the following is a specification.

In carrying out the present invention, it is my purpose to provide a vehicle indicator for vehicles, wherein the intentions of the drivers of vehicles to make a right or left hand turn will be indicated to those both forwardly and rearwardly of the vehicle upon which the indicator is installed.

The primary object of the invention is to provide such an indicator that may be attached in a novel, simple and expeditious manner to all types of vehicles, with which I am now familiar, the device comprising a pair of signal boxes adapted to be mounted at the front and rear end of the vehicle, and the signal elements of each box being actuated simultaneously by the operator of the vehicle.

A further object of my invention is to provide such an indicator for vehicles that is not only extremely simple of construction, but one that may be operated effectively under all conditions, the device including relatively few parts, and these correlated in such a manner as to reduce the possibility of disarrangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a fragmentary elevation of a portion of a front side of a vehicle showing one of my signal boxes associated therewith, together with the operating mechanism therefor.

Figure 2 is a similar view of the rear end of the vehicle equipped with the other signal box included as a part of the indicator.

Figure 3 is a detail cross section through the signal box at the front end of the vehicle.

Figure 4 is a vertical longitudinal cross section through one of the signal boxes for more clearly showing the indicating elements therein and taken substantially upon the line 4—4 of Figure 3.

Figure 5 is an elevation of the gear box that forms a part of my invention, the cover thereof being removed, and Figure 6 is a detail vertical cross section through said gear box.

With reference to the drawings, and particularly to Figures 1 and 2, 5 indicates the body of the motor vehicle, upon the rear end of which is supported as at 7 a signal box A, while upon the cowl of the body and supported through the medium of brackets 8 is another signal box B, which is similar in all respects to the box upon the rear of the machine, and therefore, a description of one will suffice for both.

Referring now to Figures 3 and 4, each of these signal boxes includes a flat-like metallic casing 9, the upper half of the front wall thereof being open at 10 for purposes presently to be set forth. Journaled transversely within the casing is a shaft 11, which extends outwardly from one side of the casing, as clearly shown in Figures 1, 2 and 3. A portion of the said shaft within the casing is squared at 12, Figure 4, and positioned thereover is a sleeve 13. Pendent from the sleeve 13 is a plate 14, while extending vertically from the sleeve and formed integral therewith and adjacent the front end thereof is an indicating character 15 in the form of a letter S. Loose upon this sleeve 13 and extending normally downwardly in opposite directions within the casing are indicating elements 16 and 17, respectively, which are preferably in the configuration of a hand. Each of these indicating elements are formed with pendent legs 18 that have engagement with the opposite sides of the plate 14, formed upon the said plate 13, whereby when the shaft 12 is rotated in opposite directions, said plate 14 will raise either hand 16 or 17, as the case may be. The normal position of the indicating hands 16 and 17 is as shown in Figure 4, the same being held against vibratory movement within the casing by spring clips 19, with which engage the index finger portions 16' and 17', respectively of the indicators 16 and 17. When these indicating hands are in the position shown in Figure 4, the letter S will be in a vertical position for consequently indicating a straight ahead travel, however, when either one of the indicators 16 or 17 is moved to an indicating position, the said letter S will be swung downwardly within its casing.

Upon the instrument board C of the vehicle, and directly behind the indicating box B is a gear box 20, that includes a pair of sections hingedly joined together, and maintained in a closed position through any form of lock mechanism. The shaft 11 of the indicator B extends within said box, and is squared at 11', and upon this squared portion is a bevelled gear 21, that has mesh with a bevelled gear 22 upon one end of a forwardly and downwardly extending shaft 22', the said shaft being journaled in the box as clearly shown in Figure 6. Above the gear 21 and in mesh therewith, is a segment 23, suitably pivoted within the box and formed with an arm 24, that extends upwardly through a slot in the top wall of the box. This arm 24 has connection to an operating wire 25, slidable within a flexible tubular housing 26. The opposite end of this wire 25 is connected to a ratchet bar 27 slidable within the keeper 28 upon the steering column D of the vehicle.

The lower end of the shaft 22 is suitably journaled at its opposite end, and carries a bevelled gear 28', that has intermesh with a similar gear 29 upon the front end of the shaft 11 of the signal box A, it being understood in this connection, that the shaft is relatively long and extends entirely beneath the floor board of the vehicle upon which the device is installed.

In view of the above description, it will at once be apparent that the ratchet bar 27 may be slid in opposite directions for moving the desired one of the indicating elements 16 and 17 for indicating both forwardly and rearwardly of the vehicles, the intention of the driver thereof to make a right or left hand turn.

Numerous advantages of a vehicle indicator of this type will be at once apparent to those skilled in the art, and although I have herein set forth the most practical embodiment of the invention with which I am familiar, it is nevertheless to be understood that minor changes may be made therein, without departing from the spirit and scope of the invention as claimed.

Having thus described my invention, what I claim as new, and desire to secure by Letters Patent, is:

1. A direction indicator for vehicles, a pair of signal boxes at the front and rear of the vehicle, each of said signal boxes including a casing provided with an opening, a shaft journaled within said casing, indicating elements loose upon said shaft, and means carried by said shaft whereby when the same is moved in opposite directions, the indicating elements will be raised and lowered.

2. A direction indicator for vehicles, a pair of signal boxes at the front and rear of the vehicle, each of said signal boxes including a casing provided with an opening, a shaft journaled within said casing, indicating elements loose upon said shaft, means carried by said shaft whereby when the same is moved in opposite directions, the indicating elements will be raised and lowered, and means for maintaining said signal elements against vibratory movement within the casing.

3. A direction indicator for vehicles, a pair of signal boxes at the front and rear of the vehicle, each of said signal boxes including a casing provided with an opening, a shaft journaled within said casing, indicating elements loose upon said shaft, means carried by said shaft whereby when the same is moved in opposite directions, the indicating elements will be raised and lowered, and means for actuating the shafts of said signal boxes simultaneously.

4. In a direction indicator for vehicles, a pair of signal boxes, at the front and rear of the vehicle, each of the same being provided with an opening, a shaft journaled through each signal box, a sleeve keyed to said shaft, indicating hands loose upon said sleeve and extending at opposite direction within the box, a plate carried by the sleeve extending between said indicating hands, whereby when the shaft is rotated in opposite directions, the indicating elements will be raised and lowered.

5. In a direction indicator for vehicles, a pair of signal boxes at the front and rear of the vehicle, each of the same being provided with an opening, a shaft journaled through each signal box, a sleeve keyed to said shaft, indicating hands loose upon said sleeve and extending at opposite directions within the box, a plate carried by the sleeve extending between said indicating hands, whereby when the shaft is rotated in opposite directions, the indicating elements will be raised and lowered, and means for actuating the shafts of the signal boxes simultaneously.

In testimony whereof I affix my signature.

OMER J. BETTEZ.